April 16, 1946. W. A. SCHULZE ET AL 2,398,468
PROCESS FOR THE TREATMENT OF HYDROCARBONS
Filed Nov. 29, 1941
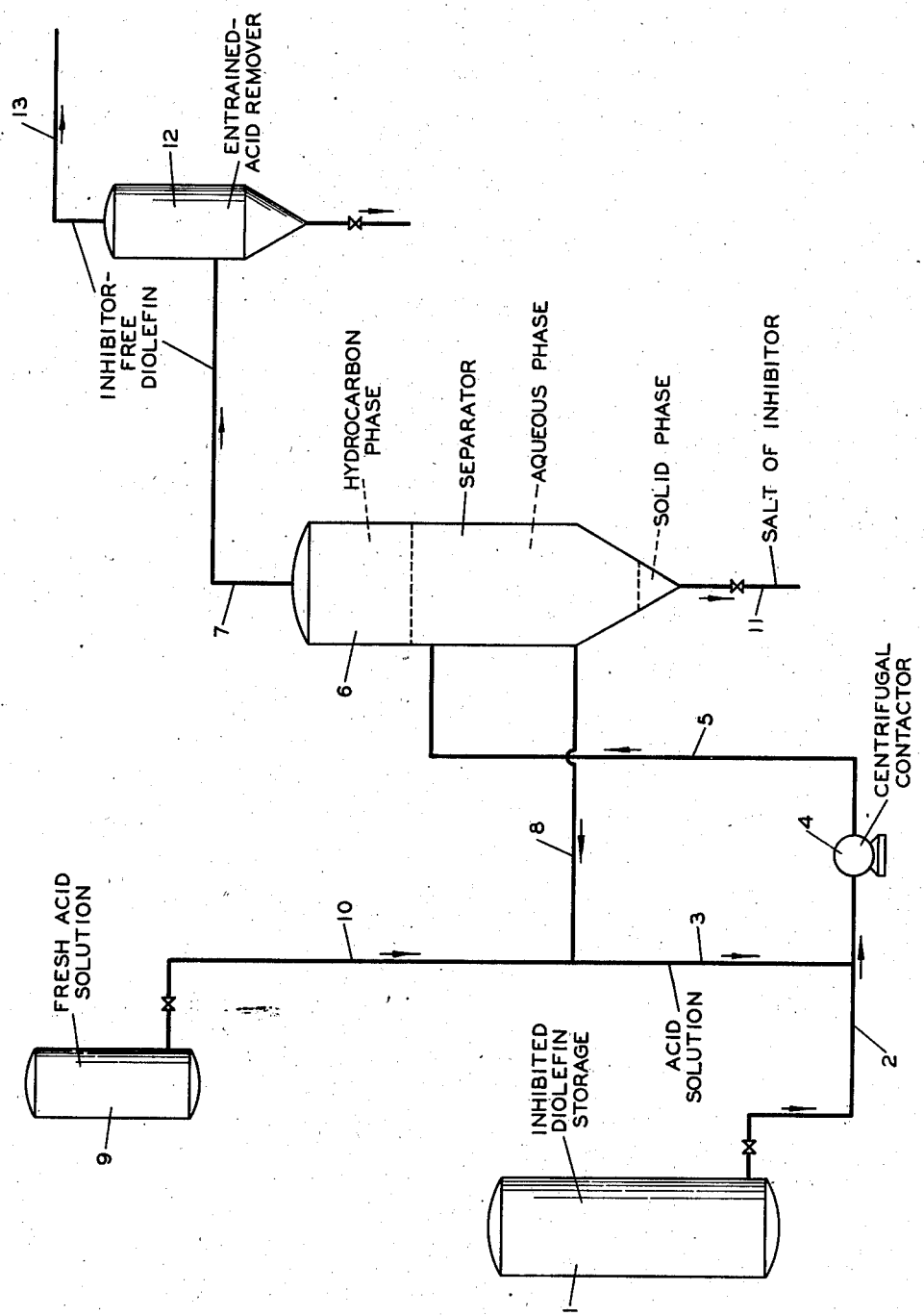
INVENTOR
WALTER A. SCHULZE
GRAHAM H. SHORT
BY
ATTORNEY Patented Apr. 16, 1946

2,398,468

UNITED STATES PATENT OFFICE 2,398,468

PROCESS FOR THE TREATMENT OF HYDROCARBONS

Walter A. Schulze and Graham H. Short, Bartlesville, Okla., assignors to Phillips Petroleum Company, a corporation of Delaware Application November 29, 1941, Serial No. 421,032

3 Claims. (Cl. 260—666.5)

This invention relates to the treatment of unsaturated hydrocarbons which tend to deteriorate and form undesirable oxidation, condensation, and/or polymerization products, in order to suppress said deterioration, particularly during storage and transportation. More specifically this invention relates to a method of stabilizing low-boiling aliphatic diolefin compounds against deterioration, by the use of certain inhibitors, said method further including means of eliminating the inhibitors when their function is no longer desired.

The presence of minor amounts of diolefinic compounds and other easily polymerizable bodies in hydrocarbon fluids such as gasoline and the like has been identified in the past with the formation of gum and similar undesirable residues. In fact, expensive treating processes have been devised to remove polymer-forming materials from gasoline by rapid conversion to polymeric forms which are removed from the gasoline.

More recently, however, certain low-boiling conjugated diolefins such as butadiene, isoprene, piperylene and the like have, by virtue of their reactivity, become extremely useful in concentrated form for controlled and/or catalytically induced polymerization or co-polymerization with other compounds by various methods. Some of the polymers produced by these methods possess properties approximating those of natural rubber. Other polymers have special desirable properties not formerly available in natural products thus creating new markets and uses for the new materials. These newly-available uses make the diolefinic compounds increasingly valuable as raw materials, and have initiated various commercial manufacturing processes for said raw materials.

The methods developed for utilizing these highly unsaturated compounds ordinarily require that they be available in a high degree of purity and substantially free of preformed polymers and polymerization inhibitors. Preformed polymers and non-volatile residues present difficulties in processing and represent a loss of valuable raw material, and polymerization inhibitors obviously interfere with the conversion of the raw materials into a salable product. Thus, while the reactivity of the diolefins makes it necessary to stabilize them during any elapsed period between production and utilization, the stabilizing means must eventually be removed from the polymerizable fluids, and the stabilizing effect thus abruptly terminated.

Numerous compounds have been used in the past to suppress the formation of gum and other undesirable components in gasoline. However, gasoline stabilizers are applied permanently and remain in the fluids up to and during the time of use as fuel. The stabilization of aliphatic diolefin concentrates and the like during storage and shipment and even during production thereof may be accomplished by addition thereto of minor quantities of inhibitors capable of suppressing deterioration. Such stabilizing additives, however, have not heretofore been directly and/or satisfactorily applicable because of the problems involved in substantially completely removing the inhibitors from the polymerizable fluids. With relatively non-volatile inhibitors, such devices as re-distillation and the like have been resorted to, but the losses of expensive material due both to mechanical causes and to actual polymerization during distillation have made such processes unsatisfactory, particularly with higher-boiling liquids.

The materials which it is desired to treat according to the present invention are the aliphatic diolefins such as butadiene and the homologs thereof and related compounds, such as isoprene, dimethyl butadiene, chloroprene, piperylene, etc. The methods of stabilizing and treating diolefins which make up the present invention are applicable to substantially pure substances of that class.

An object of this invention is the stabilization of diolefins against undesired changes during production, transportation, and/or storage.

Another object of this invention is to provide inhibitors of polymerization of these substances of such character that the diolefin may be substantially freed of inhibitors after any chosen period by the application of a simple and effective removal step.

Still another object of this invention is the disclosure of agents and methods which are efficient in the removal of inhibitors from the inhibited mixture.

Yet another object of the invention is to provide a process which inhibits the polymerization of diolefins and subsequently restores the original polymerizing tendency at any desired time.

Other objects and advantages will become apparent from the following disclosure.

We have now discovered that the deterioration and the consequent losses of diolefins may be substantially avoided by the addition of minor proportions of a special type of inhibitor to the unstable fluid. Our inhibitors are distinguished by a basic nitrogen-containing grouping and by solubility in aqueous solutions of acids through formation of water-soluble salts. Of course the inhibitors must also be sufficiently soluble in hydrocarbons to allow solution of an effective amount therein. We have further discovered means employing aqueous acidic solutions whereby the relatively small original concentrations of inhibitors in the diolfin fluids can be removed and/or reduced to such an extent that the original polymerizing tendency of said diolefins is substantially restored. The quantity of inhibitor which must be removed will depend upon the specific inhibitor and upon the use to which the diolefin is to be put. Thus in some instances a small amount of inhibitor may remain without undesirably affecting the subsequent polymerization or other utilization of the diolefin concentrate. Accordingly, the term "substantially removing" as used herein will be understood to mean removing at least such an amount of inhibitor that the remaining quantity thereof, if any, does not exhibit an undesirable inhibitory effect. By our process, the diolefins are satisfactorily stabilized, and then prepared for use in commercial polymerization processes without substantial loss of material or deactivation.

We have found that ammonia, and aliphatic, alicyclic, heterocyclic, and aromatic amines which are acid-soluble, may be used as inhibitors for diolefins as described herein. In the application of this invention, it is necessary to distinguish clearly between compounds soluble and compounds insoluble in aqueous acid solutions. For example, most, although not all, aromatic amines are insoluble in aqueous acidic solutions and are therefore unable to meet the requirements of this invention. The term "acid-soluble" as used herein defines those compounds which have an appreciable solubility in aqueous acidic solutions, either per se or as salts formed by reaction of the compounds with the acid.

While a great many compounds are thus classed as operative under the terms of the invention, they are not to be considered as equivalents from the standpoint of efficiency. Certain ones have superior characteristics and are to be preferred for economic or for other reasons. Particularly useful inhibitors are ammonia and the aliphatic amines such as the alkyl homologues of ammonia. The latter compounds may be used in more or less pure form or in commercially-available mixtures which may contain primary, secondary and/or tertiary forms of amines with alkyl substituents of one to five or more carbon atoms. Of the aromatic amines which fulfill the requirements of the process, aniline and aminophenols such as p-aminophenol are preferred inhibitors. A representative alicyclic amine is cyclohexylamine, while a suitable heterocyclic amine is 2-amino pyridine.

In protecting diolefins against deterioration, the above-listed inhibitors are preferably used in the proportions of about 0.001 to about 1.0 per cent by weight of the diolefin fluid. While greater or smaller amounts may be used, this range of concentrations furnishes stabilization consistent with economic operation. Smaller amounts afford briefer protection, and larger amounts are not always beneficial from the standpoint of immediately increased stability, although the effective period of protection may be lengthened somewhat by the use of larger amounts of inhibitor.

The maximum benefits from the use of inhibitors are obtained when said inhibitors are added to the diolefin concentrates immediately following manufacture, or in some cases during final stages of purification. The cost of the inhibitors is not excessive, and it may be desirable in some instances to add inhibitor to more or less dilute diolefin mixtures before certain processing steps and then to re-inhibit if the first addition is substantially removed during purification. In this manner, maximum protection is obtained for substantially pure diolefins as well as for those mixtures containing substantial proportions of the eventual products. However, diolefin concentrates which have not been stabilized at once may be adequately protected by later addition of inhibitors if the exposure has not been too severe.

Satisfactory application of the inhibitors disclosed according to the present invention depends on the substantially complete removal of the inhibitor from the diolefin just prior to conversion of the diolefin into valuable polymeric products. Inasmuch as the original stabilizing concentrations of the inhibitors are extremely small, the speed and completeness of a chemical reaction designed to de-activate and/or remove the inhibitor are of great importance. We have found that inhibitor removal is rapidly and smoothly accomplished by adequate contact between the diolefin liquid and aqueous solutions of certain acids. Thus, a dilute aqueous solution of a mineral acid which is substantially inert toward the diolefin and which forms water-soluble salts with the stabilizing compounds is effective in removing the inhibitors of this invention. The aqueous acid solutions to be used in the process may be prepared from acids which form water-soluble hydrocarbon-insoluble amine salts, for example mineral acids such as hydrochloric or sulfuric acids, and which in dilute form do not react with or cause the polymerization of the diolefins. Solutions of these acids containing about 1 to 10 per cent or more of the acid are satisfactory in these respects, and economical operation may be obtained with solutions containing from about 1 to about 5 per cent by weight of acid. Of course, the inhibitors of this invention may be removed by contacting the inhibited liquid with acidic agents other than the aqueous solution herein described; however, the use of said aqueous solutions is ordinarily the most efficient manner of carrying out the desired removal.

In contacting the inhibited diolefin liquid to remove the inhibitor, various methods may be used. For example, the diolefin liquid may be intimately mixed with a dilute acid solution in a centrifugal pump or its equivalent; separation of the two immiscible phases is then effected in a subsequent settling zone. Or counter-current liquid phase extraction in conventional equipment may be used with packed or multiplate columns adapted to provide the necessary contact. Other methods of mixing the hydrocarbon and aqueous phases may be used, such as jet or turbomixers or the like which produce thorough contact without forming stable emulsions.

This treatment to remove inhibitors is usually carried out most economically at near-atmospheric temperatures, with sufficient pressure on the washing system to maintain the diolefin in liquid phase. For example, pressures of about 100 pounds gage are sufficient to hold butadiene in liquid phase, while lower pressures are required to prevent vaporization of the high-boiling diolefins, many being liquid at normal atmospheric pressure and temperatures.

The accompanying drawing exemplifies the operation of the invention in removing the inhibitor from the diolefin, thereby preparing same for further processing. The inhibited liquid, for example a butadiene concentrate, is taken from storage tank 1 by line 2 to junction with line 3 through which enters a dilute acid solution which is used to remove the inhibitor. The diolefin liquid and the aqueous solution are intimately mixed in the centrifugal pump 4, and the temporary emulsion formed therein passes by line 5 to separating zone 6. The diolefin liquid substantially free of inhibitor passes out by line 7 to the absorbent filter or coagulator 12 wherein any entrained aqueous acidic solution is removed, and the effluent diolefin is withdrawn through line 13 to utilization. The acidic solution is returned through lines 8 and 3 to contact further amounts of diolefin.

The strength of the acid may be maintained by addition of fresh solution as required from make-up tank 9 through line 10 to line 3. After operation has continued for some time, the solubility of the salt of the inhibitor in the aqueous solution may be exceeded and the salt will precipitate. Any solid thus formed is collected in separator 6 and may be withdrawn intermittently or continuously through line 11. Line 11 may also be used for continuously withdrawing a quantity of partially spent acid solution equal in volume to the fresh acid solution being introduced into the system.

If desired, the acid solution may be entirely replaced at pre-determined periods as the concentration of amine salt is built up in the recirculated solution. It is often desirable to use very dilute acid solutions and renew same frequently to insure satisfactorily complete removal of the inhibitors.

When the diolefin liquids are to be sent directly from the inhibitor-removal unit to emulsion polymerization processes utilizing alkaline soap solution, vessel 12 may contain an alkaline reagent or wash solution to insure that no traces of acid or acid salts enter the subsequent stages.

*Examples*

In order to illustrate specifically the operation of the present process, the following examples are provided. Samples of freshly manufactured butadiene, isoprene, and piperylene were each divided into a number of portions, and one portion of each diolefin was stored without stabilization. The remaining portions of each diolefin concentrate were inhibited as shown in the following table, and then stored under identical conditions.

| Inhibitor | Weight per cent |
|---|---|
| Ammonia | 0.002 |
| Do | 0.02 |
| Do | 0.80 |
| Methylamine | 0.50 |
| Trimethylamine | 0.50 |
| Mixed butylamines (p. s. & t.) | 0.10 |
| Mixed amylamines | 0.10 |
| Cyclohexylamine | 0.10 |
| Aniline | 0.05 |
| 2-amino pyridine | 0.05 |

After storage for one month each portion was examined for evidence of deterioration. The control samples contained about three per cent by weight of high boiling residue. The samples containing 0.002 and 0.02 per cent of ammonia showed traces of heavy material. No signs of deterioration were observed in the other stabilized samples.

Observations on similar samples after three months storage showed about seven per cent of rubbery, partially solid polymer in the control samples. The non-volatile residue had also increased in the samples containing 0.002 and 0.02 per cent of ammonia. The other stabilized samples were free of heavy polymers.

A portion of each of the polymer-free stabilized samples was washed with a five per cent solution of sulfuric acid, and after separation of the aqueous solution was subjected to controlled polymerization with excellent results. The inhibited samples which were not acid-washed were not satisfactorily polymerized by the same method.

It is to be understood that the diolefins, inhibitors, and acidic reagents of the examples are merely illustrative and are not to be construed as limiting the invention.

We claim:

1. The method of treating substantially pure liquid butadiene to prevent polymerization thereof which comprises incorporating therewith from about 0.001 to about 1.0 weight per cent of an inhibitor consisting of ammonia sufficient to substantially prevent polymerization of said butadiene upon transportation or storage over an extended period of time, holding the resulting butadiene for such an extended period of time and under other conditions such as would result in objectionable polymerization of said butadiene in the absence of said inhibitor, and substantially completely removing said inhibitor prior to polymerization of the butadiene by intimate contact with an aqueous acid solution.

2. The method of treating substantially pure liquid butadiene to prevent polymerization thereof which comprises incorporating therewith from 0.001 to about 1.0 weight per cent of an inhibitor consisting of ammonia sufficient to substantially prevent polymerization of said butadiene over an extended period of time.

3. The method of treating substantially pure liquid butadiene to substantially prevent polymerization thereof which comprises incorporating therewith approximately 0.8 weight per cent of ammonia.

WALTER A. SCHULZE.
GRAHAM H. SHORT.